(12) United States Patent
Wilson et al.

(10) Patent No.: US 10,578,764 B2
(45) Date of Patent: Mar. 3, 2020

(54) SIMULTANEOUS ERROR CORRECTION AND INVERSION

(71) Applicant: Halliburton Energy Services, Inc., Houston, TX (US)

(72) Inventors: Glenn A. Wilson, Singapore (SG); Burkay Donderici, Houston, TX (US); Luis Emilio San Martin, Houston, TX (US); Junsheng Hou, Kingwood, TX (US)

(73) Assignee: Halliburton Energy Services, Inc, Houston, TX (US)

( * ) Notice: Subject to any disclaimer, the term of this patent is extended or adjusted under 35 U.S.C. 154(b) by 198 days.

(21) Appl. No.: 15/302,404

(22) PCT Filed: Nov. 19, 2015

(86) PCT No.: PCT/US2015/061483
§ 371 (c)(1),
(2) Date: Oct. 6, 2016

(87) PCT Pub. No.: WO2017/086960
PCT Pub. Date: May 26, 2017

(65) Prior Publication Data
US 2017/0269255 A1    Sep. 21, 2017

(51) Int. Cl.
*G06G 7/48* (2006.01)
*G01V 3/38* (2006.01)
(Continued)

(52) U.S. Cl.
CPC .................. *G01V 3/38* (2013.01); *E21B 7/04* (2013.01); *E21B 44/005* (2013.01);
(Continued)

(58) Field of Classification Search
USPC .................................................. 703/6, 8, 10
See application file for complete search history.

(56) References Cited

U.S. PATENT DOCUMENTS

| 7,092,822 B2 * | 8/2006 | Lenormand | G01N 13/02 |
| | | | 702/13 |
| 2003/0229449 A1 * | 12/2003 | Merchant | E21B 47/022 |
| | | | 702/7 |

(Continued)

FOREIGN PATENT DOCUMENTS

WO    WO-2015065371 A1    5/2015

OTHER PUBLICATIONS

Anderson_2001 (Modeling and Inversion Methods for Interpretation of Resistivity Logging Tool Response, ISBN 90-407-2231-5 2001 Schlumberger Technology Corp (Year: 2001).*

(Continued)

*Primary Examiner* — Brian S Cook
(74) *Attorney, Agent, or Firm* — Gilliam IP PLLC

(57) ABSTRACT

In some embodiments, an apparatus and a system, as well as a method and article of manufacture, may operate to parameterize a geological formation in terms of initial earth model parameters, and generate predicted data by simulating a tool response using earth model parameters. Further activity may include determining a difference between calibrated data and the predicted data; and simultaneously adjusting calibration parameters and the earth model parameters such that the difference between them satisfies selected convergence criteria, so that a controlled device can be operated according to at least one of updated calibration parameters, updated calibrated data, or updated earth model parameters. Additional apparatus, systems, and methods are disclosed.

21 Claims, 9 Drawing Sheets

(51) Int. Cl.
  *G01V 3/18* (2006.01)
  *G01V 99/00* (2009.01)
  *E21B 7/04* (2006.01)
  *E21B 44/00* (2006.01)
  *E21B 49/00* (2006.01)
  *G01V 3/28* (2006.01)
  *E21B 47/12* (2012.01)

(52) U.S. Cl.
  CPC .............. *E21B 49/003* (2013.01); *G01V 3/18* (2013.01); *G01V 3/28* (2013.01); *G01V 99/005* (2013.01); *E21B 47/122* (2013.01)

(56) References Cited

U.S. PATENT DOCUMENTS

2006/0064181 A1* 3/2006 Kato ................... G05B 13/042
2007/0255500 A1* 11/2007 Pita ......................... G01V 1/30 702/11
2008/0215243 A1 9/2008 Rabinovich et al.
2009/0005992 A1 1/2009 Alumbaugh et al.
2009/0119076 A1* 5/2009 Madatov ............... G01V 1/282 703/2

OTHER PUBLICATIONS

"International Application Serial No. PCT/US2015/061483, International Search Report dated Sep. 21, 2016", 4 pgs.

"International Application Serial No. PCT/US2015/061483, Written Opinion dated Sep. 21, 2016", 11 pgs.

Raiche, A. P., et al., "The joint use of coincident loop transient electromagnetic and Schlumber sounding to resolve layered structures", Geophysics, 50(10), (Oct. 1985), 1618-1627.

* cited by examiner

SIMULTANEOUS ERROR CORRECTION AND INVERSION

PRIORITY APPLICATIONS

This application is a U.S. National Stage Filing under 35 U.S.C. § 371 from International Application No. PCT/US2015/061483, filed on 19 Nov. 2015, which application is incorporated herein by reference in its entirety.

BACKGROUND

Understanding the structure and properties of geological formations can reduce the cost of drilling wells for oil and gas exploration. Measurements made in a borehole (i.e., downhole measurements) are typically performed to attain this understanding, to identify the composition and distribution of material that surrounds the measurement device downhole. For example, some measurements involve the acquisition and processing of electromagnetic (EM) data.

In state-of-the-art workflows, EM data are calibrated, processed, and inverted in separate procedures. Thus, errors in one of these procedures can easily affect others in the same processing sequence. Given these circumstances, iterative (i.e., cycles of successive) workflows may be employed for calibrating, processing, and inverting EM data, to reduce the effect of such errors.

DETAILED DESCRIPTION

Figure 1:
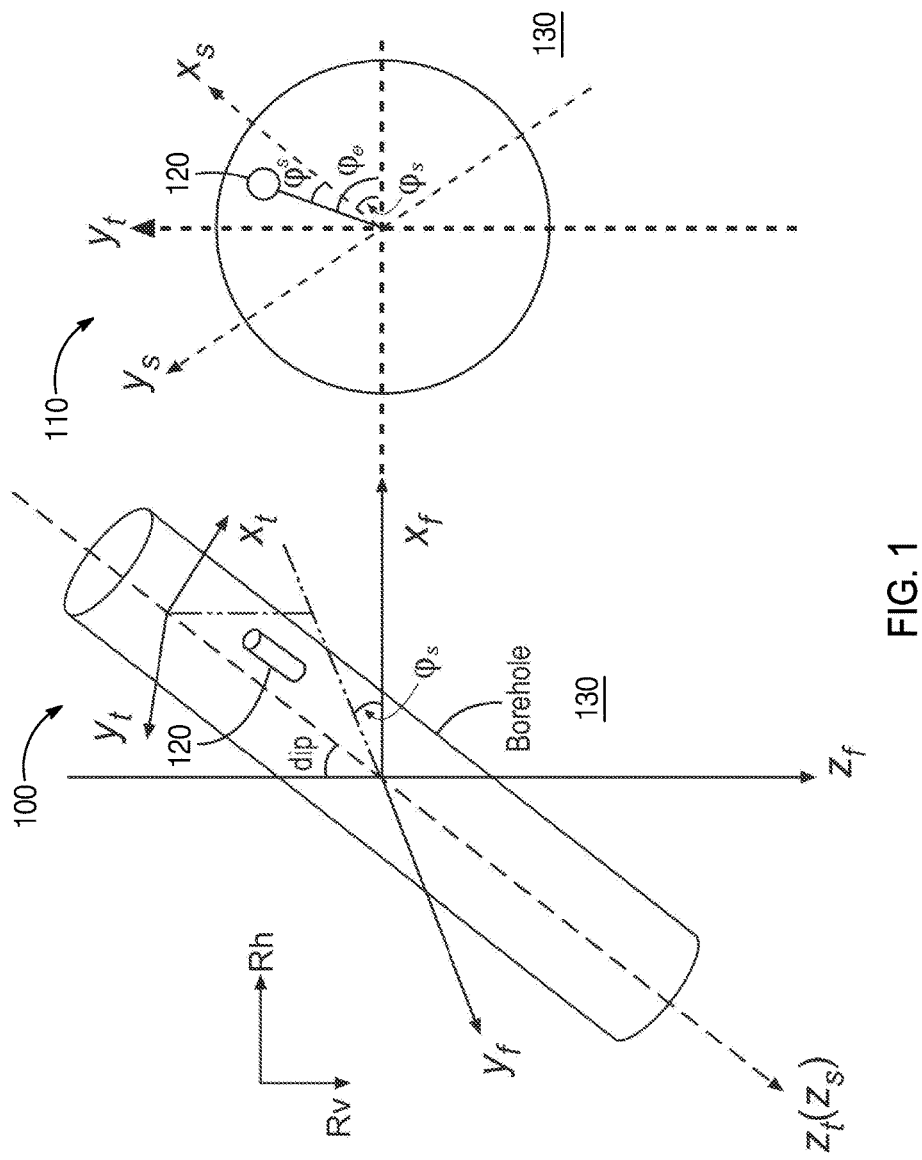
FIG. 1 illustrates perspective and top views of a multi-component induction (MCI) tool operating in an anisotropic formation, according to various embodiments.

To begin the discussion, it is useful to note that error types in borehole EM measurement systems can be broadly designated as either random errors or systematic errors. Random errors, also referred to as random noise, are not strictly random, but are caused by unpredictable events that impact data acquisition (e.g., vibration), and are expressed stochastically rather than deterministically. Random noise is accommodated by typical assumptions made about errors in inversion algorithms (e.g., Gaussian noise) because they are zero-centered, and tend to be uncorrelated in time and frequency.

Systematic errors are not usually random, because they often result from some form of mis-calibration of the borehole EM measurement system, which may take the form of an MCI wireline tool or a propagation resistivity logging-while-drilling (LWD) tool. Thus, the more common examples of systematic error may include: incorrect cancellation of the primary field, incorrect knowledge of the system gain, incorrect synchronization between the transmitter and receiver time bases, and temperature-dependent electronic drift. Moreover, EM instruments may drift out of calibration during transportation and/or operation. This latter type of drift sometimes leads to frequent, potentially erroneous or time-consuming re-calibrations in the field; including the maintenance of calibration equipment and software (such as calibration loops), an EM noise-free surface environment, and personnel qualified to perform the calibration. The calibration accuracy is typically limited due to operational constraints, and may result in resistivity inaccuracies in high resistivity formations.

Systematic errors may be constant, or slowly varying with respect to space and time; typically at scale lengths larger than the geological signal. As a matter of contrast, mechanical impacts applied to the measurement equipment can generate systematic errors with a sudden change of impulsive type.

Systematic errors are not accommodated by the typical assumptions made about errors in inversion algorithms because they are biased (i.e., not zero-centered), and tend to be correlated in time and frequency. When analyzed as individual components or frequencies, systematic errors are not readily identifiable. However, when analyzed as multiple components and/or frequencies, systematic errors produce inconsistencies between the data and plausible earth models. Since systematic errors have non-random physical causes, they can be expressed deterministically rather than stochastically (as opposed to random noise errors).

Various embodiments described herein relate to apparatus, systems, and methods of simultaneously calibrating, processing, and inverting EM data for data calibration and earth models, to correct for systematic error. While much of the discussion is focused on wireline-deployed applications, those of ordinary skill in the art, after reading this document, will realize that each of the methods described herein can also be applied in LWD, measurement-while-drilling (MWD), and permanent monitoring applications.

Thus, to address some of the challenges noted above, as well as others, various embodiments may operate to formulate a calibration error for EM data, such that the EM data can be corrected (for calibration errors), processed, and inverted—simultaneously, in a single workflow. It is noted that the procedures described herein are not intended as a replacement for tool measurement calibrations, but instead, to compensate for the departure from perfect calibration that is present in almost every tool operation. The fact that tool calibration can and should still be used, implies that in general the variables associated with corrected calibration are relatively small perturbations, which do not over-burden subsequent analyses for formation evaluation.

The correction model introduced herein is designed to parameterize systematic errors in EM measurements. The model includes, and accommodates errors in gain, phase, and bias.

To begin the discussion of how systematic errors can be corrected as part of a simultaneous process, one may consider a perfectly calibrated, single frequency borehole EM system, operating in a layered earth model described by conductivity $\sigma(r)$ which may be anisotropic and/or frequency dependent (e.g., inclusive of dielectric and induced polarization terms). This perfectly calibrated EM system measures a complex response $f^p(\sigma(r))$, which may be an EM field component (e.g., magnetic induction) or a transfer function (e.g., apparent conductivity).

Figure 2:
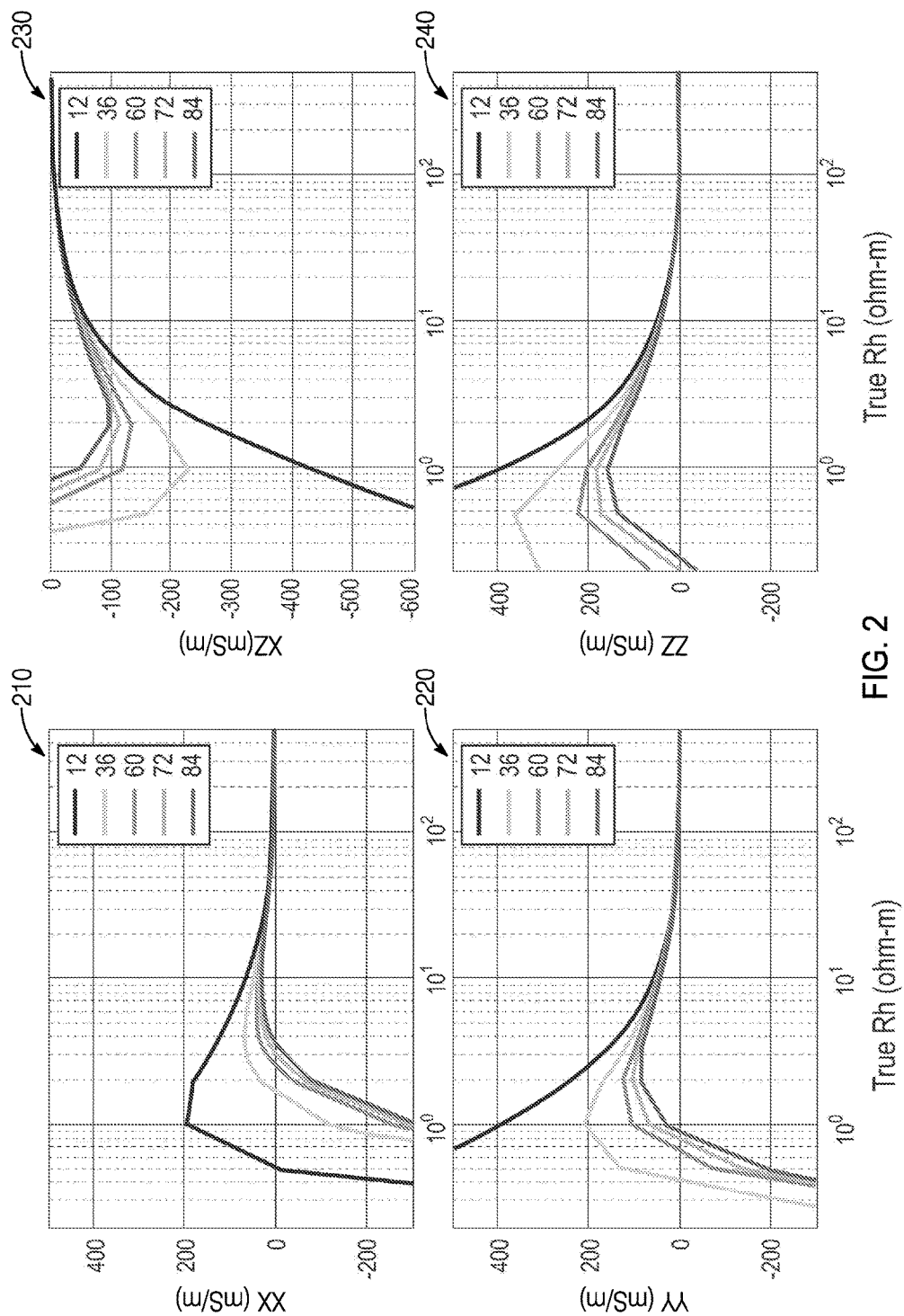
FIG. 2 is a set of graphs illustrating simulated EM data for the MCI tool of FIG. 1.

Such a system is shown in FIG. 1, which illustrates perspective and top views 100, 110 of a multi-component induction (MCI) tool 120 operating in an anisotropic formation 130, according to various embodiments. FIG. 2 is a set of graphs 210, 220, 230, 240 illustrating simulated EM data for the MCI tool of FIG. 1, where the tool 120 includes a sub-triaxial array that provides the measurement components XX, YY, XZ, and ZZ, at different operating frequencies.

Here it is assumed that the tool 120 is operating in a borehole made in a homogenous (TI) formation having horizontal and vertical resistivities of Rh and Rv, respectively. The tool 120 is surrounded by oil-based mud (OBM) in that borehole, that has a diameter of 8", with a borehole dip of 60 degrees, a dip azimuth of zero degrees, an eccentricity of 0.5, and eccentricity angle of 30 degrees, an anisotropic ratio (Rvh=Rv/Rh) of 2, and values of Rh=10, 15, 20, 50, 70, 100, 150, and 200 ohm m.

Figure 3:
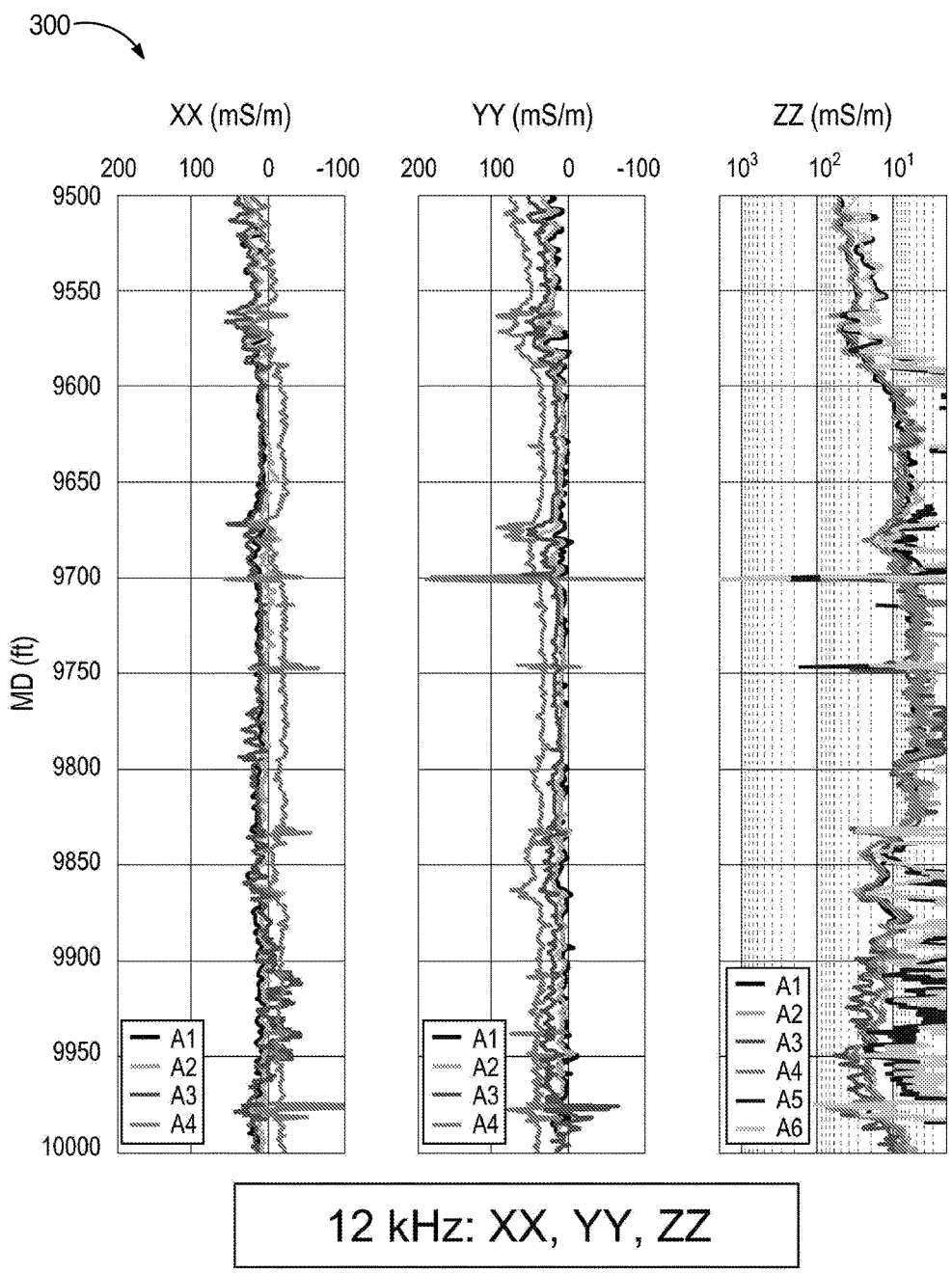
FIG. 3 is a set of 12 kHz MCI log data from a well, according to various embodiments.
Figure 4:
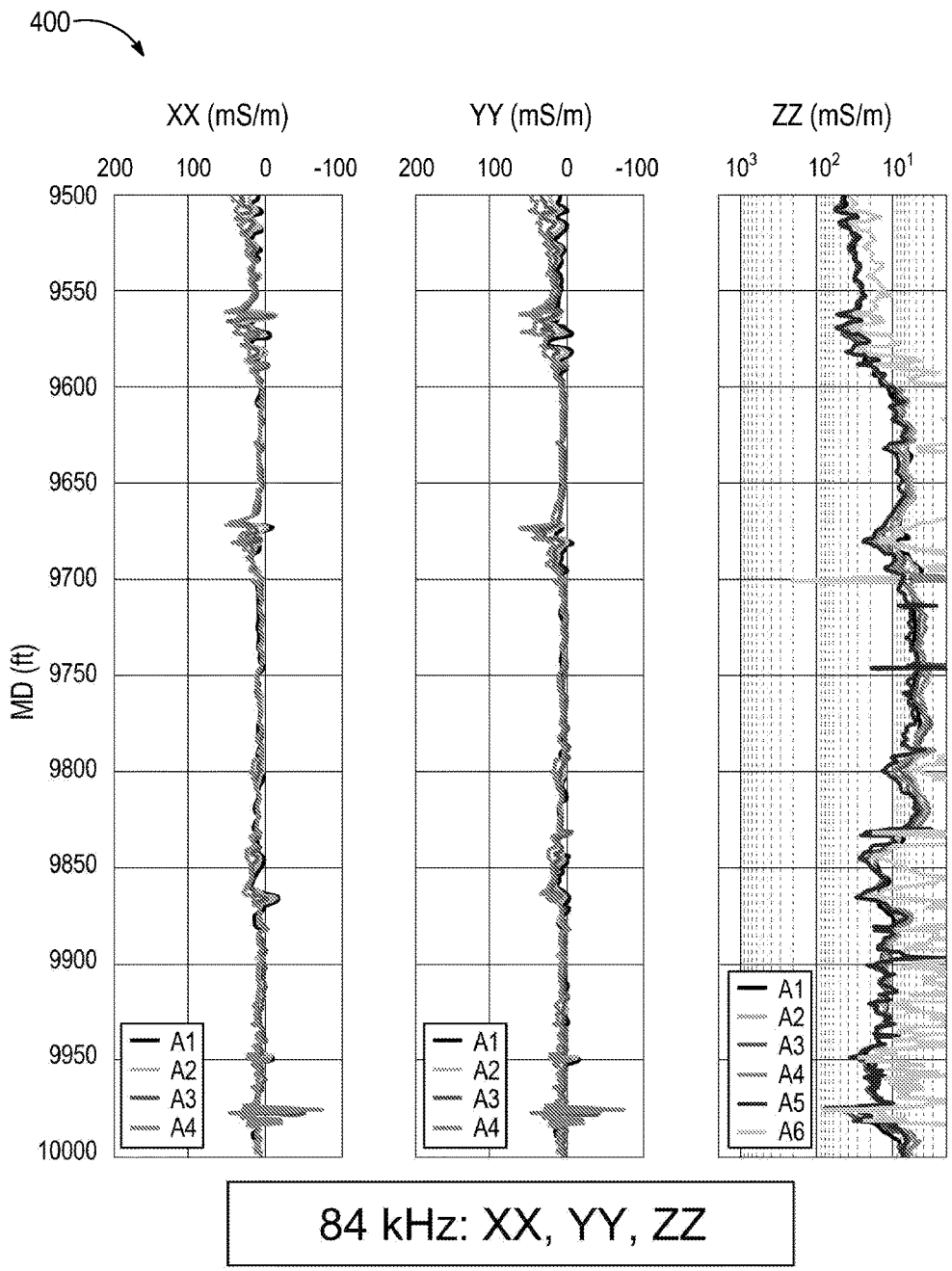
FIG. 4 is a set of 84 kHz MCI log data from a well, according to various embodiments.

FIG. 3 is a set of 12 kHz MCI log data from a well, according to various embodiments. FIG. 4 is a set of 84 kHz MCI log data from the well, according to various embodiments. In each case, the graphs provide an example of pre-processed MCI measurements displayed in the form of a well log 300, 400 with conventional calibration and temperature correction. When these logs 300, 400 are examined, those of ordinary skill in the art will realize that the order of the sensor components A1 . . . A6 from left to right, as measured using 12 kHz and 84 kHz frequencies, is different. The radial symmetry between the XX and YY axes that would normally be expected across the horizontal measurement plane, is missing. This out-of-order presentation represents a systematic error, which should be corrected prior to inversion. If the error is not corrected, or if the error is not corrected properly, then the corresponding earth models will contain errors which manifest as non-geological artifacts.

Referring now to FIG. 1, the MCI tool 120 can be seen to operate in an anisotropic wholespace, realized as the formation 130. For the same earth model, when a perfectly calibrated system produces a response of $f^p(\sigma(r))$, a miscalibrated system observes the complex response:

$$f^o = se^{i\theta}[f^p(\sigma(r)) + b]. \quad (1)$$

where i is the imaginary unit, s is a multiplicative real amplitude scaling factor (known as the system gain; for a perfectly calibrated system, s=1.0), the real valued θ is the phase difference between the transmitter and receiver time references (for a perfectly calibrated system, θ=0.0), and the complex-valued bias b (known as the zero-level) is the response that is observed when no secondary fields are present (e.g., with the tool suspended in air, distant from any conductors; or in a thick layer. That is, for a perfectly calibrated system, b=0.0+0.0i.

These calibration errors can be used to correct the EM system measurements, moving them from an imperfect state (e.g., with calibration errors) to a more ideal state (e.g., with reduced calibration errors). It is noted that the calibration errors are generally small compared to the dynamic range of the EM system. However, the nonlinearity of the EM system is such that these small errors may propagate as significant errors in the interpreted formation resistivities.

Gain, phase, and bias errors usually vary as a function of time or position in a well log; implying that calibration errors will also vary as a function of time or position.

However, in some instances, they may not vary at all. In ideal embodiments, the parameterization of the calibration errors is based on a sound understanding of how each error varies, and what the causes are. For example, gain and phase calibration procedures are usually carried out prior to making each well log. It is reasonable to expect systematic calibration errors would change from well log to well log, because of different errors that might be introduced on each occasion. Therefore, parameterization should allow for calibration errors that have a constant value for all samples within each run of a well logging operation. Further, because calibrations may be performed separately for each transmitter-receiver pair, separate calibration parameters are should be allowed for each transmitter-receiver pair.

For multi-frequency processing, additional constraints can be imposed. For example, the order of magnitude as a function of frequency and/or offset can be imposed a priori to ensure that the data are calibrated in a manner that is physically realistic.

In some embodiments, the general parameterization of calibration errors can be based on the following classifications: well; well log; well log run; well log interval; transmitter-receiver pair; frequency; and an in-phase or quadrature component, where the calibration errors can be considered constant over one classification or group of classifications, or piecewise-continuous (e.g., linear) over any classification or group of classifications. The specific choice will be system and log specific.

The number of possible parameterizations of the calibration model is large, but optimal results can be achieved when the parameterization best reflects the observed systematic calibration errors. For example, based on a common understanding of causes in gain error, there is no physical justification to parameterize the gain as a piecewise-continuous function in a well log. Rather, it can be held at a constant value for each well log, or well log interval (i.e., a subset of a well log). Similarly, for short well log intervals, it can be assumed that the phase and bias errors are constant. This exploits the temporal coherency of systematic errors.

In the following development discussion, the calibration parameters for the $j^{th}$ frequency of the $k^{th}$ transmitter-receiver pair will be designated as: the scalar $s_{j,k}$ for the gain, the scalar $\theta_{j,k}$ for the phase, and the complex expression $b_{j,k} = b_{j,k,ip} + i b_{j,k,qd}$ for the bias, where ip and qd respectively denote in-phase and quadrature. In the following, it will also be assumed that these parameters are spatially and temporally independent (e.g., constant for a given well log interval). However, this may be generalized to include situations with spatial and temporal dependence.

With an assumed dependence on $\tilde{\sigma}(r)$, we generalize the perfect system response as:

$$f_{j,k}^p = f_{j,k,ip}^p + i f_{j,k,qd}^p. \quad (2)$$

Applying the calibration model from Equation (1), the actual system response is:

$$f_{j,k}^o = s_{j,k} e^{i\theta_{j,k}}[f_{j,k}^p + b_{j,k}] = s_{j,k} e^{i\theta_{j,k}}[f_{j,k}^p + b_{j,k,ip} + i b_{j,k,qd}], \quad (3)$$

which is separated into in-phase and quadrature components as follows:

$$f_{j,k,ip}^o = s_{j,k}[(f_{j,k,ip}^p + b_{j,k,ip})\cos\theta_{j,k} - (f_{j,k,qd}^p + b_{j,k,qd})\sin\theta_{j,k}] \quad (4)$$

$$f_{j,k,qd}^o = s_{j,k}[(f_{j,k,ip}^p + b_{j,k,ip})\sin\theta_{j,k} - (f_{j,k,qd}^p + b_{j,k,qd})\cos\theta_{j,k}] \quad (5)$$

The sensitivities for the each of the calibration and conductivity parameters will now be derived.

Gain Sensitivity Functions

The derivatives of the in-phase and quadrature components of the observed data with respect to the gain calibration parameter are given by:

$$\frac{\partial f_j^O, k, ip}{\partial s_{j,k}} = (f_{j,k,ip}^P + b_{j,k,ip})\cos\theta_{j,k} - (f_{j,k,qd}^P + b_{j,k,qd})\sin\theta_{j,k}, \tag{6}$$

$$\frac{\partial f_j^O, k, qd}{\partial s_{j,k}} = (f_{j,k,ip}^P + b_{j,k,ip})\sin\theta_{j,k} + (f_{j,k,qd}^P + b_{j,k,qd})\cos\theta_{j,k}. \tag{7}$$

Phase Sensitivity Functions

The derivatives of the in-phase and quadrature components of the observed data with respect to the phase calibration parameter are given by:

$$\frac{\partial f_j^O, k, ip}{\partial s_{j,k}} = s_{j,k}[-(f_{j,k,ip}^P + b_{j,k,ip})\sin\theta_{j,k} - (f_{j,k,qd}^P + b_{j,k,qd})\cos\theta_{j,k}], \tag{8}$$

$$\frac{\partial f_j^O, k, ip}{\partial s_{j,k}} = s_{j,k}[(f_{j,k,ip}^P + b_{j,k,ip})\cos\theta_{j,k} - (f_{j,k,qd}^P + b_{j,k,qd})\sin\theta_{j,k}]. \tag{9}$$

Bias Sensitivity Functions

The derivatives of the in-phase and quadrature components of the observed data with respect to the in-phase component of the phase calibration parameter are given by:

$$\frac{\partial f_j^O, k, ip}{\partial b_{j,k,ip}} = s_{j,k}\cos\theta_{j,k}, \tag{10}$$

$$\frac{\partial f_j^O, k, qd}{\partial b_{j,k,ip}} = s_{j,k}\sin\theta_{j,k}. \tag{11}$$

The derivatives of the in-phase and quadrature components of the observed data with respect to the quadrature component of the phase calibration parameter are given by:

$$\frac{\partial f_j^O, k, ip}{\partial b_{j,k,qd}} = -s_{j,k}\sin\theta_{j,k}, \tag{12}$$

$$\frac{\partial f_j^O, k, qd}{\partial b_{j,k,qd}} = s_{j,k}\cos\theta_{j,k}. \tag{13}$$

Conductivity Sensitivity Functions

The derivatives of the in-phase and quadrature components of the observed data with respect to the conductivity parameters are:

$$\frac{\partial f_j^O, k, ip}{\partial \sigma} = s_{j,k}\left[\frac{\partial f_j^P, k, ip}{\partial \sigma}\cos\theta_{j,k} - \frac{\partial f_j^P, k, qd}{\partial \sigma}\sin\theta_{j,k}\right], \tag{14}$$

$$\frac{\partial f_j^O, k, qd}{\partial \sigma} = s_{j,k}\left[\frac{\partial f_j^P, k, ip}{\partial \sigma}\sin\theta_{j,k} + \frac{\partial f_j^P, k, qd}{\partial \sigma}\cos\theta_{j,k}\right]. \tag{15}$$

Note that the parameterization of the conductivity is general. It may comprise 1D, 2D, or 3D (i.e., 1-dimensional, 2-dimensional, or 3-dimensional, respectively) conductivity models constructed as layers (1D), slices (2D), or volumes (3D). The EM modeling method can be based on any combination of analytical and/or semi-analytical and/or finite-difference and/or finite-volume and/or finite-element and/or boundary-element and/or integral equation methods implemented in Cartesian and/or cylindrical and/or polar coordinates, among others. The modeling method may also include accessing and interrogating pre-computed database of models. The modeling method can be programmed on serial and/or parallel (including graphics processing unit) processing architectures.

The derivatives of the in-phase and quadrature components of the observed data with respect to the conductivity parameters can be calculated analytically, quasi-analytically, or numerically.

Without loss of generality, the EM attributes of the earth models can include resistivity, conductivity, permittivity, permeability, chargeability, and other induced polarization (IP) parameters. The EM attributes of the earth models can be either isotropic or anisotropic.

Inversion Methodology

To recover the $N_m$ length vector m of calibration and conductivity model parameters from the observed data, we construct the Tikhonov parametric functional:

$$p^\alpha(m) + \phi_d(m) + \alpha\phi_m(m) \to \min, \tag{16}$$

where $\phi_d(m)$ is a misfit functional:

$$\phi_d(m) = \|w_d(A(m) - d)\|_D^2, \tag{17}$$

where $w_d$ is an $N_d \times N_d$ data weighting matrix, A is a non-linear operator, d is the $N_d$ length vector of data, and $\|\ldots\|_D^2$ is a data-space norm; $\phi_m(m)$ is a stabilizing functional:

$$\phi_m(m) = \|w_m(m - m_{apr})\|_M^2, \tag{18}$$

where $w_m$ is an $N_m \times N_m$ model weighting matrix, $m_{apr}$ is the $N_m$ length vector of a prior calibration and conductivity model parameters, and $\|\ldots\|_M^2$ is a model-space norm; and $\alpha$ is a regularization parameter that provides balance (or bias) between the misfit and stabilizing functionals.

Equation (16) can be solved using any appropriate stochastic or deterministic optimization method (e.g., conjugate gradients; Gauss-Newton; etc.), as are well-known to those of ordinary skill in the art. For deterministic solutions of Equation (16), it is useful to evaluate the sensitivity (or Frechet or Jacobian) matrix; the elements of which were evaluated in Equations (14) and (15). Those that desire to learn more about these methods can refer to "Geophysical Inverse Problems and Regularization Theory" by M. S. Zhdanov, Elsevier, Amsterdam, 2002. In most embodiments, a priori information can be imposed as a choice of data weights, model weights, regularization, model constraints and/or a priori models.

The data and model weights are introduced to reweigh the inversion in terms of logarithmic data and model parameters. This has the advantage of reducing the dynamic range of both data and model parameters; helping to ensure, for example, that multi-frequency data are not biased towards high frequency data, or that models are not biased towards parameters with larger values. Angle-based parameters (e.g., dip, phase calibration), which are expressed in radians to give magnitudes of similar order to the other logarithmic model parameters, may be considered as an exception in some embodiments.

In some embodiments, the model weights can include spatial filters; e.g., to recover either smooth or sharp earth models. In some embodiments, when found to be useful, the model weights can include appropriate functions to enforce a priori order on any disordered EM data.

Workflows and Methods

Figure 5:
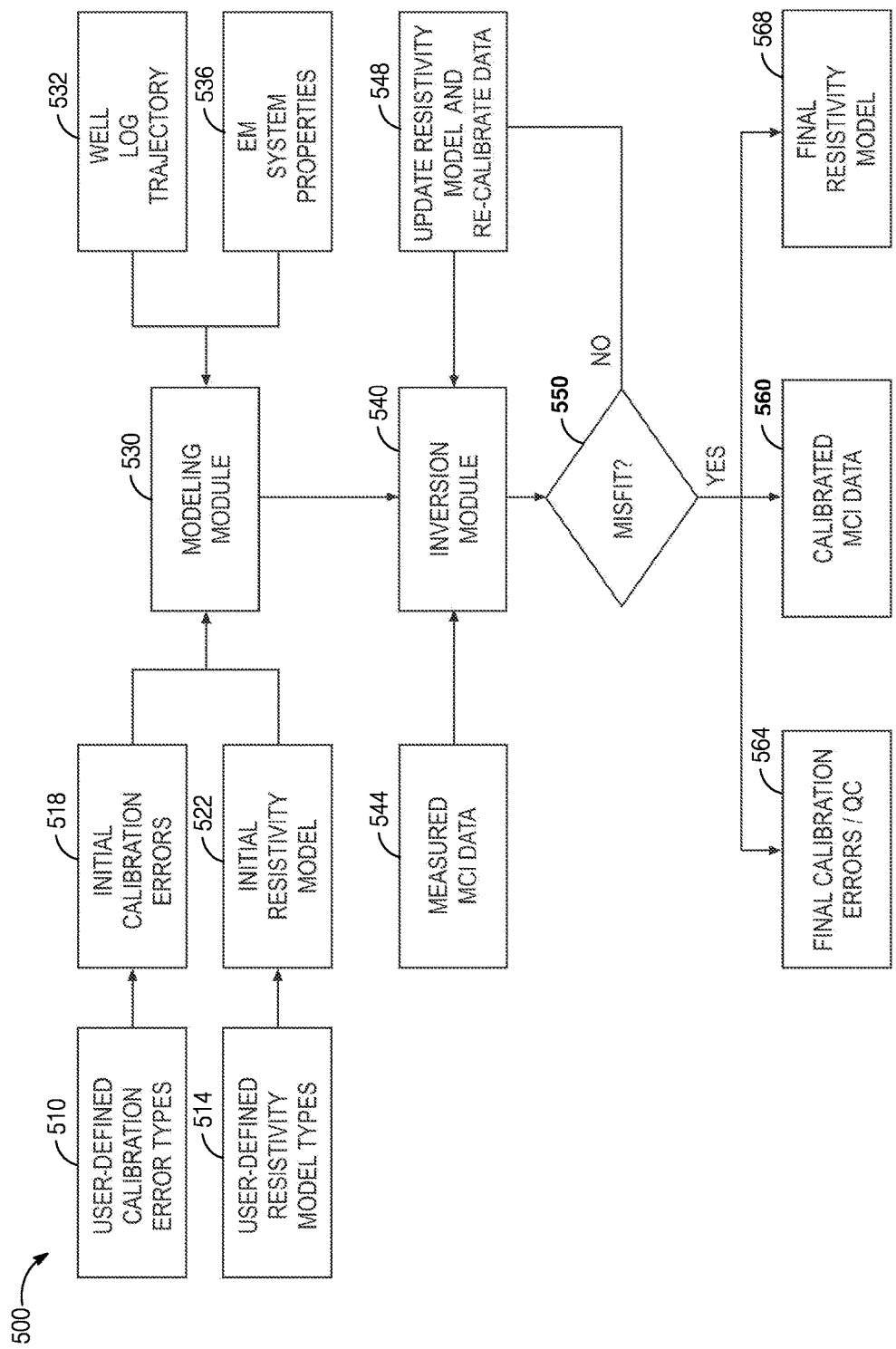
FIG. 5 is a workflow diagram for a method that provides simultaneous calibration, processing, and inversion of the EM data of FIGS. 2-4, provided by the tool of FIG. 1, according to various embodiments.

FIG. 5 is a workflow diagram for a method 500 that provides simultaneous calibration, processing, and inversion of the EM data of FIGS. 2-4, as provided by the tool of FIG. 1, according to various embodiments. The modeling and inversion methods described herein can be implemented as a stand-alone set of instructions, or integrated into commercially-available logging software (e.g., InSite Anywhere® stand-alone data delivery system, available from Halliburton Energy Systems, Inc. of Houston, Tex.) or earth modeling software (e.g., DecisionSpace® software available from Landmark Graphics Corporation of Houston, Tex.), perhaps through the use of an application programming interface (API).

The processing of the modeling and inversion, and related functions may be performed remotely from the well site (e.g., using a cloud computation cluster), with computers at the well site being connected to the remote processing computers via a network. This means that the computers at the well site may operate without high computational performance, and subject to network reliability, all modeling and inversion can effectively be conducted in real time.

In the workflow of FIG. 5, user-defined calibration error types and resistivity model types 510, 514 are used to determine the existence of initial calibration errors at block 518, and to selected the initial models at block 522, respectively. The error type determination and initial model are provided to the modeling module at block 530. At the same time, the well log trajectory (block 532) and the EM system (e.g., MCI tool) properties (block 536) are also provided to the modeling module 530.

The modeling module 530 output (e.g., from both earth and data calibration models) is modeled data and sensitivities that are provided to the inversion at block 540, along with measurements made by the MCI tool at block 544. At the same time, the updated model parameters (e.g., for both the earth and calibration models) are provided to the inversion at block 540. Thus, when the data measured by the MCI tool at block 544 enters the inversion at block 540, the updated model parameters, as well as the measured data, are treated simultaneously.

At block 550 a determination is made, as to whether the misfit between the measured MCI data and the output of the inversion (i.e., the data predicted by the earth model), is less than a preselected threshold. If it is not, then the workflow includes updating the earth/calibration model parameters at block 548 so that a better fit to the measured data is obtained, at which point the updated model parameters are again provided to the inversion model 540 along with the measured data at 544. This may involve recalculating the modeled data and sensitivities using the modeling module 530. After another inversion occurs at block 540, another misfit comparison is made at block 550.

If the misfit between the data predicted by the earth model (i.e., the output of the inversion) and the measured MCI data is now less than the preselected threshold, which means that convergence has been achieved, then the workflow includes presentation of the calibrated data at block 560, the final calibration errors (e.g., for quality control) at block 564, and the final resistivity model at block 568. It is noted that the workflow of FIG. 5 may be augmented with additional selection and convergence criteria.

Other Considerations

The methods disclosed can be incorporated in any method of joint inversion of EM data with any other borehole geophysical data (e.g., acoustic, nuclear, NMR). The methods disclosed can be applied to any EM system, including but not limited to wireline, logging-while-drilling (LWD), or permanent monitoring. The methods disclosed can be generalized to include procedures required for other data calibration or correction factors, such as the removal of borehole correction effects.

Example Operations

For the purpose of demonstrating execution of the method 500, consider the ZZ component of an MCI tool with unit dipole transmitters and receivers, operating in a vertical borehole, where the quadrature component can be given by:

$$H_{zz,qd} \approx \frac{\omega\mu}{4\pi L}\sigma_h. \quad (19)$$

Assuming a calibration model with gain and bias, the measured voltage can be expressed as:

$$H_{zz,qd} = s\left(\frac{\omega\mu}{4\pi L}\sigma_h + b\right), \quad (20)$$

such the following sensitivities are obtained:

$$\frac{\partial H_{zz,qd}}{\partial \sigma_h} = s\frac{\omega\mu}{4\pi L}, \quad (21)$$

$$\frac{\partial H_{zz,qd}}{\partial s} = \frac{\omega\mu}{4\pi L}\sigma_h + b, \text{ and} \quad (22)$$

$$\frac{\partial H_{zz,qd}}{\partial s} = s. \quad (23)$$

For this model, the spacing between transmitters-receivers of 17" and 29", along with operating frequencies of 12 and 24 kHz, and a horizontal conductivity of 0.1 S/m, are assumed, along with a gain of 1.2 and a bias of $10^{-3}$ V. Given a set of three model parameters ($\sigma_h$, s, and b), the modeling operator of Equation (20), and the sensitivity functions represented by Equations (21) to (23), an iterative inversion can be constructed. In this example, the iterative inversion is based on the damped singular value decomposition (SVD) solution to the Gauss-Newton method. Those of ordinary skill in the art are familiar with this type of solution. Others that desire further information are referred to the literature, including "The Joint Use of Coincident Loop Transient Electromagnetic and Schlumberger Sounding to Resolve Layered Structures" by Raiche et al., Geophysics, Vol. 50, pp 1618-1627, 1985. Indeed, any inversion or optimization method can be used.

TABLE I

| Inversion test | Model parameter | True value | Initial value | Final value |
|---|---|---|---|---|
| 1 | $\sigma_h$ | 0.1000 | 0.2000 | 0.0999 |
|   | s | 1.2000 | 1.000 | 0.1924 |
|   | b | 0.0010 | 0.0008 | 0.0009 |
| 2 | $\sigma_h$ | 0.5000 | 0.1000 | 0.5340 |
|   | s | 1.3000 | 1.0000 | 1.2345 |
|   | b | 0.0010 | 0.0008 | 0.0009 |
| 3 | $\sigma_h$ | 1.0000 | 0.1000 | 1.0945 |
|   | s | 1.3000 | 1.000 | 1.2995 |
|   | b | 0.0100 | 0.0010 | 0.0038 |

Table I presents examples of inversion inputs and outputs retrieved after the inversion converged to an RMS misfit of less than 1%, when this model is employed as part of executing the method 500.

As can be seen in the table, the iterative simultaneous inversion process shown in the method 500 is able to recover conductivity and gain parameters relatively quickly. This was so, even though the sensitivity of the bias parameter was relatively low, as given by the relatively small singular values from the SVD of the sensitivity matrix. Thus, additional embodiments may be realized.

Figure 6:
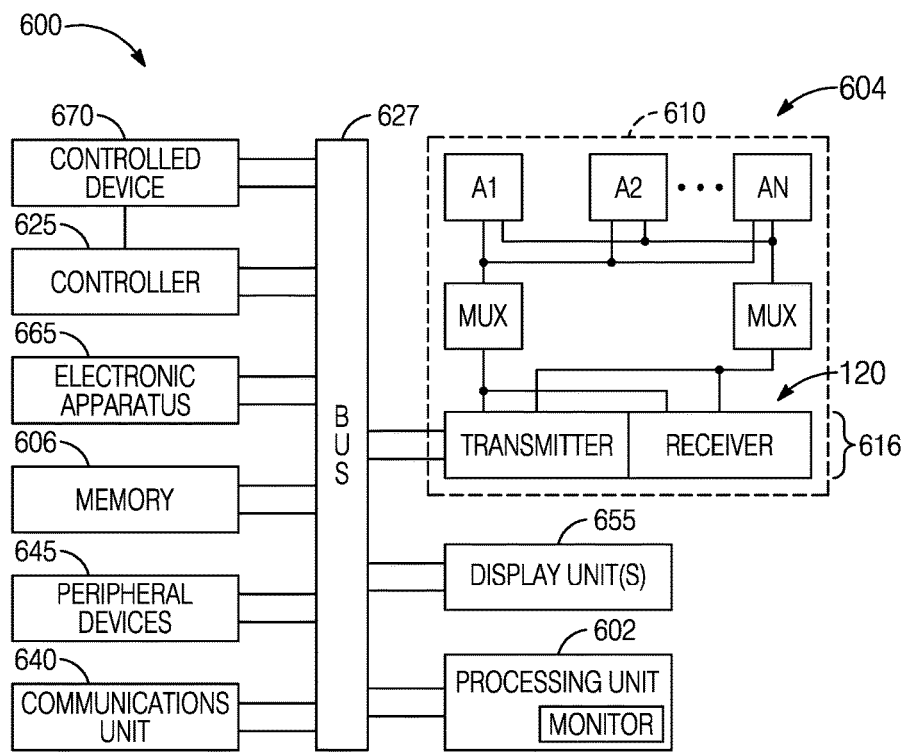
FIG. 6 is a block diagram of a data acquisition, processing, and control system according to various embodiments.

For example, FIG. 6 is a block diagram of a data acquisition, processing, and control system 600 according to various embodiments. Here it can be seen that the system 600 may further include one or more transmitters and/or receivers, such as MCI tool transmitters/receivers 616 as part of a measurement device 604.

The device 604 may comprise an MCI tool 120, with coils A1 . . . AN. These coils A1 . . . AN may be arranged in a number of ways. For example, the coils A1 . . . AN may be deployed in the form of a transmitter triad (i.e., a collocated tri-axial array of coils) and six sets of receiver coils. The two receiver coils closest to the transmitter may comprise induction coils, and the remaining four coils may be constructed as triads.

Using the measurement device 604, the logging system 600 can receive measurements and other data (e.g., location, magnetic field strength data, etc.) from the transmitters receivers 606. The device 604 can be located on the surface of the Earth, such as in a laboratory, or downhole, perhaps attached to a housing 610.

The processing unit 602 can couple to the measurement device 604 to obtain measurements from the measurement device 604, and its components. Thus, in some embodiments, a system 600, such as a logging system, comprises a housing 610 that forms part of the device 604, and other elements. The housing 610 might take the form of a wireline tool body, or a downhole tool as described in more detail below with reference to FIGS. 8 and 9. The processing unit 602 may be part of a surface workstation or attached to a downhole tool housing. In some embodiments, the processing unit 602 is packaged within the housing 610.

The system 600 can include a controller 625, other electronic apparatus 665, and a communications unit 640. The controller 625 and the processing unit 602 can be fabricated to operate the measurement device 604 to acquire measurement data, such as signals representing MCI tool measurements.

The controller 625 may operate to control a controlled device 670, either directly, or using commands from the processing unit 602. The controlled device might take the form of a bit steering apparatus (e.g., geosteering device) in some embodiments, to directly control the direction of drilling. In some embodiments, the controlled device 670 might take the form of an alarm, to be activated in response to the activity of a monitoring element MONITOR that is used to observe the values measured by the device 604, and present an alarm when the values enter selected desired, or undesired ranges.

Electronic apparatus 665 (e.g., electromagnetic sensors, current sensors, etc.) can be used in conjunction with the controller 625 to perform tasks associated with taking measurements downhole. The communications unit 640 can include downhole communications in a drilling operation. Such downhole communications can include a telemetry system.

The system 600 can also include a bus 627 to provide common electrical signal paths between the components of the system 600. The bus 627 can include an address bus, a data bus, and a control bus, each independently configured. The bus 627 can also use common conductive lines for providing one or more of address, data, or control, the use of which can be regulated by the controller 625.

The bus 627 can include instrumentality for a communication network. The bus 627 can be configured such that the components of the logging system 600 are distributed. Such distribution can be arranged between downhole components such as the measurement device 604 and components that can be disposed on the surface of a well. Alternatively, several of these components can be co-located, such as on one or more collars of a drill string or on a wireline structure.

In various embodiments, the system 600 includes peripheral devices that can include displays 655, additional storage memory, or other control devices that may operate in conjunction with the controller 625 or the processing unit 602. The display 655 can display diagnostic, measurement, and alarm information, based on the signals generated, received, and processed according to embodiments described above.

In an embodiment, the controller 625 can be fabricated to include one or more processors. The display 655 can be fabricated or programmed to operate with instructions stored in the processing unit 602 (for example in the memory 606) to implement a user interface to manage the operation of the system 600, as well as components distributed within the system 600. This type of user interface can be operated in conjunction with the communications unit 640 and the bus 627. Various components of the logging system 600 can be integrated with the transmitters/receivers 606 and the housing 610, such that processing identical to or similar to the methods discussed previously, and those that follow, can be accomplished with respect to various embodiments that are described herein.

In various embodiments, a non-transitory machine-readable storage device may comprise instructions stored thereon, which, when performed by a machine, cause the machine to become a customized, particular machine that performs operations comprising one or more features similar to or identical to those described with respect to the methods and techniques described herein. A machine-readable storage device, herein, is a physical device that stores information (e.g., instructions, data), which when stored, alters the physical structure of the device. Examples of machine-readable storage devices can include, but are not limited to, memory 606 in the form of read only memory (ROM), random access memory (RAM), a magnetic disk storage device, an optical storage device, a flash memory, and other electronic, magnetic, or optical memory devices, including combinations thereof.

The physical structure of stored instructions may be operated on by one or more processors such as, for example, the processing unit 602. Operating on these physical structures can cause the machine to become a specialized machine that performs operations according to methods described herein. The instructions can include instructions to cause the processing unit 602 to store associated data or other data in the memory 606. The memory 606 can store the results of measurements of formation and casing/tubing parameters, to include gain parameters, calibration constants, identification data, sensor location information, etc. The memory 606 can store a log of the measurement and location information provided by the measurement device 604. The memory 606 therefore may include a database, for example a relational database. In some embodiments, the database may comprise the parameters and data described with respect to the workflow of FIG. 5. Thus, many embodiments may be realized.

Figure 7:
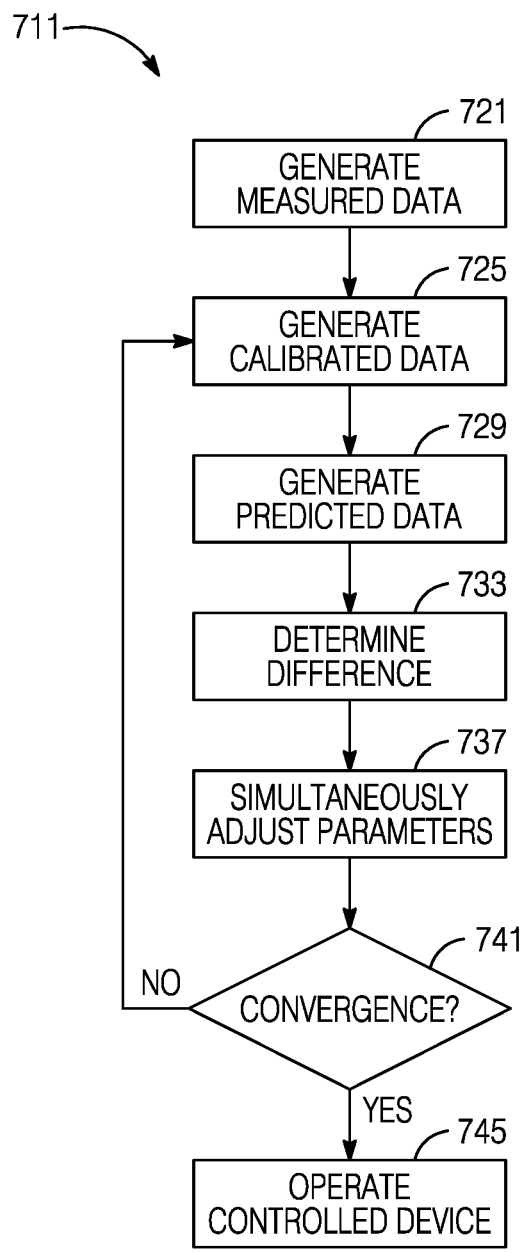
FIG. 7 is flow diagram for a method, according to various embodiments.

For example, FIG. 7 is flow diagram for a method 711, according to various embodiments. The activities accomplished in the method 711 described herein are with reference to the workflow of FIG. 5, and the apparatus and systems shown in FIGS. 1, 6, and 8-9.

In some embodiments, the method 711 comprises operating to analyze a geological formation, and adjust operations in the field, based on the results of the analysis. The method 711 may thus comprise determining the difference between calibrated and predicted formation data at block 733; adjusting calibration and earth model parameters until a desired amount of convergence is achieved at block 737 and 741; and operating a controlled device using the adjusted parameters at block 745.

In some embodiments, the method 711 includes generating measured data at block 721; applying initial calibration parameters to the measured data at block 725; generating predicted data at block 729; calculating a misfit between the predicted and calibrated, measured data at block 733; adjusting the calibration parameters and earth model parameters at block 737 until one or more convergence criteria are satisfied at block 741—which serves to generate updated calibration parameters and updated earth model parameters; and then operating a controlled device according to the updated parameters at block 745.

The Earth model may include resistivity parameters, density parameters, porosity parameters, etc. The controlled device may comprise a drill bit, a display, or electrical/mechanical components that affect tool calibration, among others. Thus, many variations may be realized.

For example, in some embodiments, a method 711 comprises generating measured data associated with a geological formation by making measurements affected by tool response in a well bore at block 721.

The measured data can be gathered during wireline or drilling operations. Thus, in some embodiments, the activity at block 721 may comprise obtaining the measured data from the geological formation during wireline, drilling, or permanently installed sensing operations.

In some embodiments, the method 711 may continue on to block 725, to include generating calibrated data by applying calibration parameters to the measured data.

Once the earth model parameters and calibration parameters are revised, the revised calibration parameters are applied to the measured data, and another simultaneous inversion is accomplished, to produce an updated earth model and updated calibration parameters, along with new inverted data that is used to again check for convergence. Thus, in some embodiments, the activity at block 725 may comprise generating revised calibrated data by applying the revised calibration parameters to the measured data.

In some embodiments, the method 711 may continue on to block 729 to include parameterizing the geological formation in terms of initial earth model parameters, and generating predicted data by simulating the tool response using earth model parameters.

In some embodiments, the method 711 may continue on to block 733 to include determining a difference between the calibrated data and the predicted data.

The difference between predicted data and calibrated data can be evaluated according to the degree of misfit, such as a percentage of the root mean square. Thus, in some embodiments, determining the difference at block 733 further comprises determining the difference between the calibrated data and the predicted data is less than a selected threshold by evaluating convergence to a misfit.

In some embodiments, the method 711 may continue on to block 737 to include simultaneously adjusting the calibration parameters and the earth model parameters such that the difference satisfies convergence criteria (as determined at block 741), to generate updated calibration parameters, updated calibrated data, and updated earth model parameters.

Thus, when convergence is not achieved, as determined at block 741, the earth model and calibration parameters may be revised at block 737, such that the activity of simultaneously adjusting the parameters includes adjusting the calibration parameters and the earth model parameters to provide revised calibration parameters and revised earth model parameters when the difference between the calibrated data and the predicted data is greater than the selected threshold (as determined at block 741). In some embodiments, the activity at block 737 includes (e.g., after further iterations) simultaneously adjusting the revised calibration parameters and the revised earth model parameters such that the differences between the revised calibrated data and the predicted data satisfy the convergence criteria (as determined at block 741), to generate the updated calibration parameters, the updated calibrated data, and the updated earth model parameters.

In some embodiments of the method 711, inversion can be accomplished according to a general form. Thus, the activity at block 737 may comprise calculating a misfit functional from a weighted residual error vector comprising weighted differences between the calibrated data and the predicted data.

In some embodiments, a sensitivity matrix can be constructed, based on the calibration parameters. Thus, the activity at block 737 may comprise calculating a stabilizing functional from the calibration parameters and the earth model parameters, and calculating a weighted sensitivity matrix of weighted sensitivities associated with the calibration parameters and the earth model parameters; and solving an inverse problem by minimizing a parametric functional formed by a linear combination of the misfit functional and the stabilizing functional. Then, at block 741, the method 711 may include evaluating the convergence criteria of the inverse problem.

In some embodiments, the weighted sensitivity matrix is generated by applying data and/or model weights to the sensitivity matrix. Thus, the activity at block 737 may comprise generating a weighted sensitivity matrix by applying data weights, model weights, or both to the sensitivity matrix.

As is the case with some inversion processes, among many that can be chosen, a regularized pseudo-inverse (for a non-square) matrix can be calculated, using the weighted sensitivity matrix. Thus, in some embodiments, the activity at block 737 may comprise generating a matrix comprising a regularized pseudo-inversion of the weighted sensitivity matrix by calculating a regularized pseudo-inverse of the weighted sensitivity matrix.

Once the regularized pseudo-inversion of the weighted sensitivity matrix is calculated, the earth model can be updated by determined changes in the Earth model parameters. Thus, in some embodiments, the activity at block 737 may comprise determining a change in parameters associated with the earth model as the regularized pseudo-inversion of the weighted sensitivity matrix multiplied by a regularized version of the residual error vector; and updating the earth model parameters to provide the updated earth model parameters using the change in parameters.

Some embodiments of the method 711 continue on to block 745 to include operating a controlled device in the well bore according to at least one of the updated calibration parameters, the updated calibrated data, or the updated earth model parameters.

For example, the inverted data can be used to control drilling operations, such as adjusting the weight on bit, rotation rate, etc. Thus, in some embodiments, operating the controlled device at block 745 comprises operating a geosteering device to select or modify a drilling direction in the geological formation, based on the updated earth model parameters The calibrated data and/or updated parameters can be published for viewing, perhaps in the form of 2D or 3D graphs. Thus, in some embodiments, operating the controlled device at block 745 comprises publishing at least some values of the at least one of the updated calibration parameters, the updated calibrated data, or the updated earth model parameters in a human-readable form. For example, publishing may comprise at least one of printing or displaying on a video display.

Updated values can be stored for transportation, perhaps in a storage device that can be transported or that can be copied through the Internet. Thus, in some embodiments, operating the controlled device at block 745 comprises recording at least some of the updated calibration parameters, the updated calibrated data, or the updated earth model parameters in a form that can be transported physically or electronically.

The performance of a downhole tool can be adjusted according to the updated calibration parameters. For example, when the updated calibration parameters fall outside of acceptable limits, it may be that a transmitter or receiver are no longer calibrated, and operating frequencies or amplifier gains can be adjusted to compensate, to return the tool to a calibrated condition; either during operation, or after returning the tool back to the surface. Thus, in some embodiments, operating the controlled device at block 745 comprises recalibrating a downhole tool using the updated calibration parameters. Many other embodiments may be realized.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program, to perform the methods described herein. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment. Thus, other embodiments may be realized.

Figure 8:
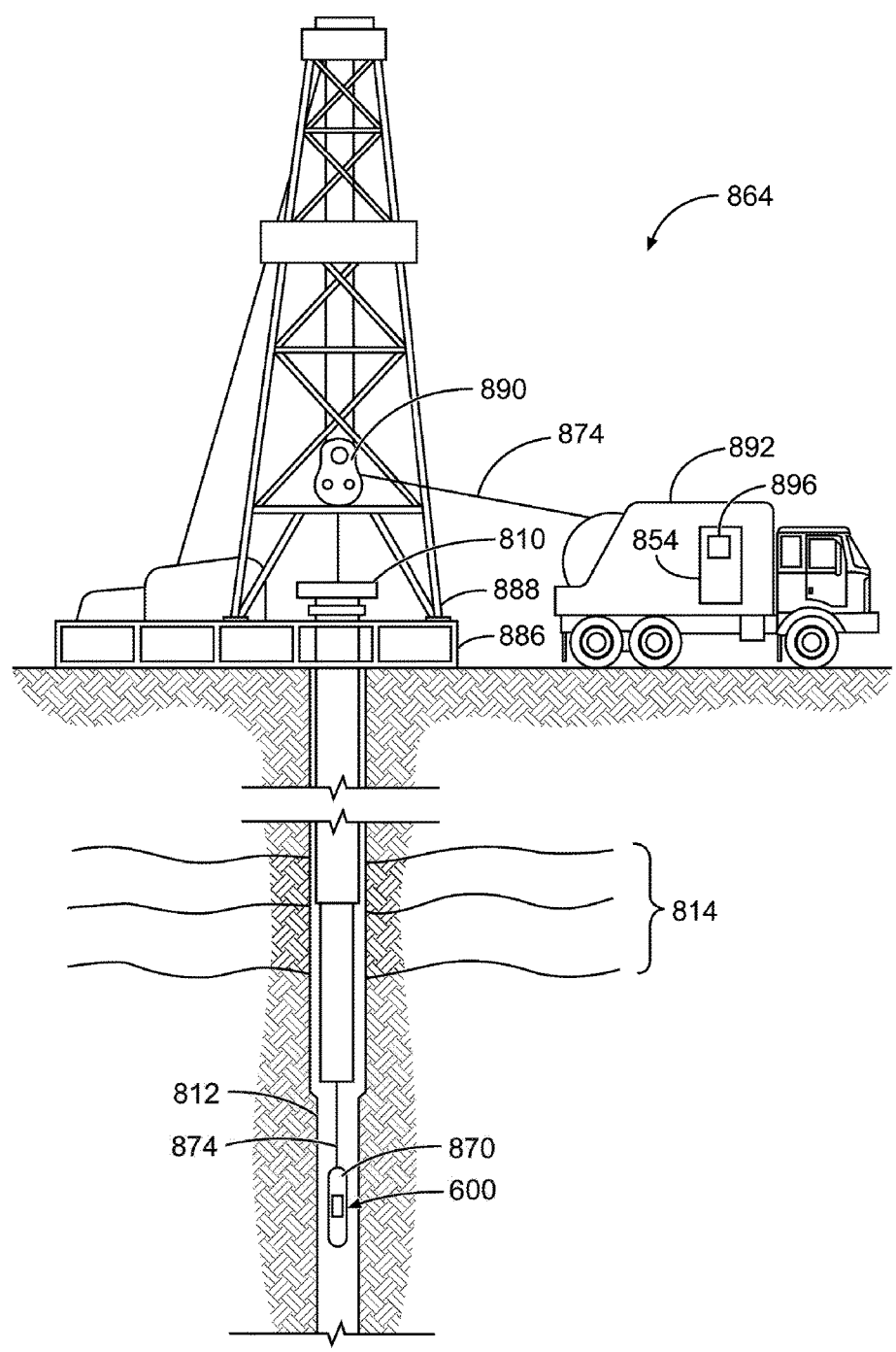
FIG. 8 depicts an example wireline system, according to various embodiments.
Figure 9:
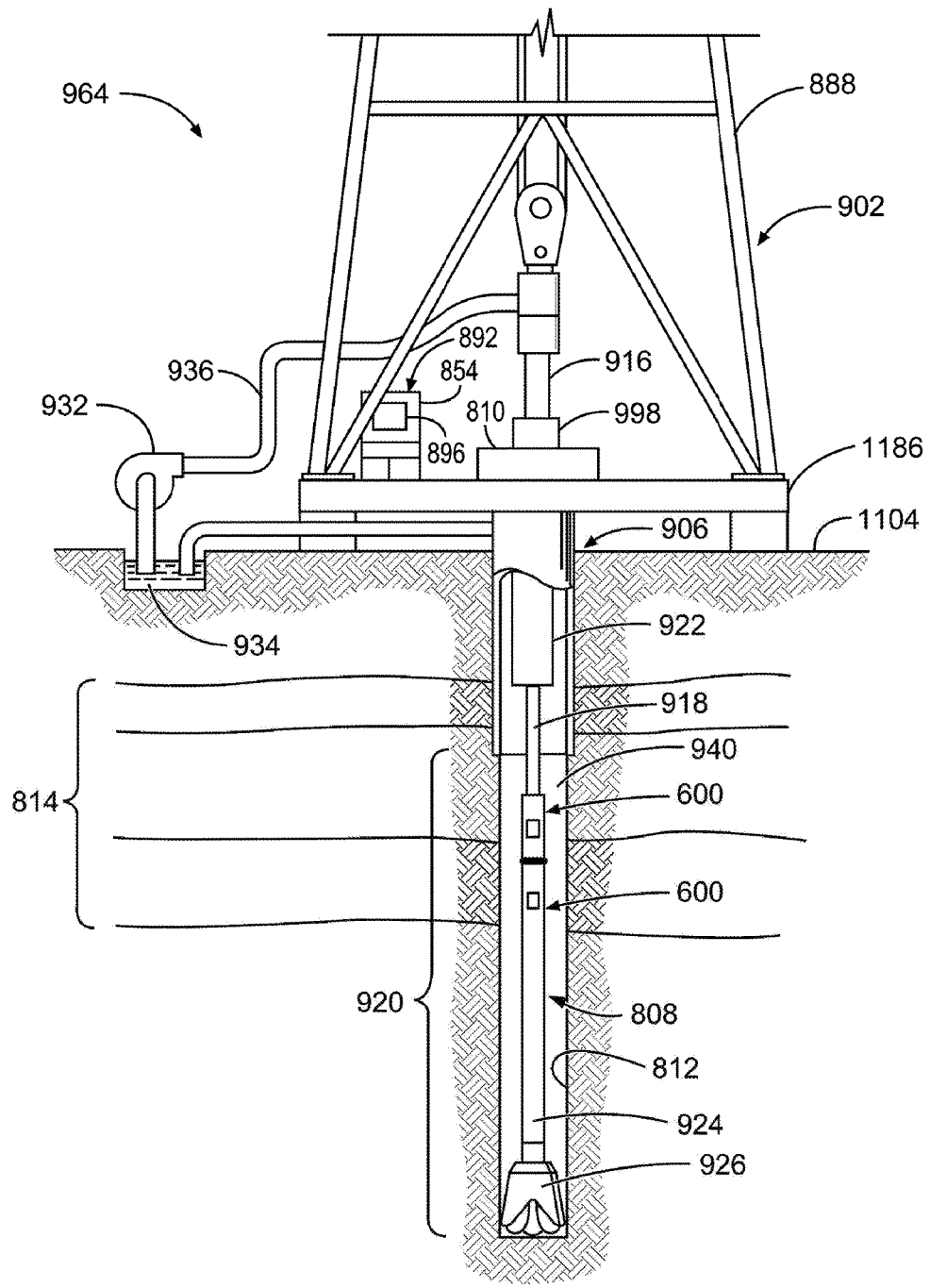
FIG. 9 depicts an example drilling rig system, according to various embodiments.

For example, FIG. 8 depicts an example wireline system 864, according to various embodiments. FIG. 9 depicts an example drilling rig system 964, according to various embodiments. Either of the systems in FIG. 8 and FIG. 9 are operable to control a system 600, or any combination of its components (see FIG. 6), perhaps mounted to a wireline logging body 870, or a downhole tool 924; to conduct measurement operations in a well, to determine conditions in a formation (e.g., measure resistivity), and to control devices as part of hydrocarbon exploration and recovery operations. Thus, the systems 864, 964 may comprise portions of a wireline logging tool body 870 as part of a wireline logging operation, or of a downhole tool 924 (e.g., drilling operations tool) as part of a downhole drilling operation.

Returning now to FIG. 8, a well during wireline logging operations can be seen. In this case, a drilling platform 886 is equipped with a derrick 888 that supports a hoist 890.

Drilling oil and gas wells is commonly carried out using a string of drill pipes connected together so as to form a drilling string that is lowered through a rotary table 810 into a well, also called a borehole 812. Here it is assumed that the drilling string has been temporarily removed from the borehole 812 to allow a wireline logging tool body 870, such as a probe or sonde, to be lowered by wireline or logging cable 874 into the borehole 812. Typically, the wireline logging tool body 870 is lowered to the bottom of the region of interest and subsequently pulled upward at a substantially constant speed.

During the upward trip, at a series of depths the instruments (e.g., the measurement device 604 shown in FIG. 6) included in the tool body 870 may be used to perform measurements on the subsurface geological formations adjacent the borehole 812 (and the tool body 870). The measurement data can be communicated to a surface logging facility 892 for storage, processing, and analysis. The logging facility 892 may be provided with electronic equipment for various types of signal processing, which may be implemented by any one or more of the components of the system 600 shown in FIG. 6. Similar formation evaluation data may be gathered and analyzed during drilling operations (e.g., during LWD operations, and by extension, sampling while drilling).

In some embodiments, the tool body 870 comprises one or more systems 600 for obtaining and communicating measurements in a subterranean formation through a borehole 812. The tool is suspended in the well by a wireline cable 874 that connects the tool to a surface control unit (e.g., comprising a workstation 854, which can also include a display). The tool may be deployed in the borehole 812 on coiled tubing, jointed drill pipe, hard wired drill pipe, or any other suitable deployment technique.

Turning now to FIG. 9, it can be seen how a system 964 may also form a portion of a drilling rig 902 located at the surface 904 of a well 906. The drilling rig 902 may provide support for a drill string 908. The drill string 908 may operate to penetrate the rotary table 810 for drilling the borehole 812 through the subsurface formations 814. The drill string 908 may include a Kelly 916, drill pipe 918, and a bottom hole assembly 920, perhaps located at the lower portion of the drill pipe 918.

The bottom hole assembly 920 may include drill collars 922, a downhole tool 924, and a drill bit 926. The drill bit 926 may operate to create the borehole 812 by penetrating the surface 904 and the subsurface formations 914. The downhole tool 924 may comprise any of a number of different types of tools including MWD tools, LWD tools, and others.

During drilling operations, the drill string 908 (perhaps including the Kelly 916, the drill pipe 918, and the bottom hole assembly 920) may be rotated by the rotary table 810. Although not shown, in addition to, or alternatively, the bottom hole assembly 920 may also be rotated by a motor (e.g., a mud motor) that is located downhole. The drill collars 922 may be used to add weight to the drill bit 926. The drill collars 922 may also operate to stiffen the bottom hole assembly 920, allowing the bottom hole assembly 920 to transfer the added weight to the drill bit 926, and in turn, to assist the drill bit 926 in penetrating the surface 904 and subsurface formations 814.

During drilling operations, a mud pump 932 may pump drilling fluid (sometimes known by those of ordinary skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 812. The drilling fluid may then be returned to the mud pit 934, where such fluid is filtered. In some embodiments, the drilling fluid can be used to cool the drill bit 926, as well as to provide lubrication for the drill bit 926 during drilling operations. Additionally, the drilling fluid may be used to remove subsurface formation cuttings created by operating the drill bit 926.

Thus, it may be seen that in some embodiments, the systems 864, 964 may include a drill collar 922, a downhole tool 924, and/or a wireline logging tool body 870 to house one or more systems 600, or components of the system 600, similar to or identical to those that have been described above.

Thus, for the purposes of this document, the term "housing" may include any one or more of a drill collar 922, a downhole tool 924, or a wireline logging tool body 870 (all having an outer wall, to enclose or attach to magnetometers, sensors, fluid sampling devices, pressure measurement devices, transmitters, receivers, coils, fiber optic cable, acquisition and processing logic, and data acquisition systems). The tool 924 may comprise a downhole tool, such as an LWD tool or MWD tool. The wireline tool body 870 may comprise a wireline logging tool, including a probe or sonde, for example, coupled to a logging cable 874. Many embodiments may thus be realized.

Any of the above components, including those of the systems 500, 864, 964 may all be characterized as "modules" herein. Such modules may include hardware circuitry, and/or a processor and/or memory circuits, software program modules and objects, and/or firmware, and combinations thereof, as desired by the architect of the apparatus and systems described herein, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a measured radiation simulation package, a strain simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus and systems are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Thus, many other embodiments may be realized.

For example, referring now to FIGS. 6 and 8-9, it can be seen that in some embodiments, a system 600 may comprise a tool (e.g., the device 604) to measure geological formation properties, and a processing unit 602 to process the results using the simultaneous inversion of the measured data, Earth model parameters, and calibration parameters to operate a controlled device 670.

In some embodiments, a system 600 comprises at least one tool (e.g., the device 604, or one or more components thereof) to measure properties of a geological formation as measured data. The system 600 may further comprise a processing unit 602 coupled to the at least one tool to receive the measured data, the processing unit to generate calibrated data by applying calibration parameters to the measured data; to parameterize the geological formation in terms of initial earth model parameters, and generate predicted data by simulating the tool response using earth model parameters. The processing unit 602 may further operate to determine a difference between the calibrated data and the predicted data; to simultaneously adjust the calibration parameters and the earth model parameters such that the difference satisfies convergence criteria; to generate updated calibration parameters, updated calibrated data, and updated earth model parameters; and to operate a controlled device 670 according to at least one of the updated calibration parameters, the updated calibrated data, or the updated earth model parameters.

The system may include a bit steering mechanism. Thus, in some embodiments, the controlled device 670 comprises a bit steering mechanism that is operated to control drilling operations in the geological formation.

A variety of tools can be used to acquire measured data, including electromagnetic tools. Thus, in some embodiments, the at least one tool comprises an MCI tool.

A monitor may be used to keep track of transitions from invaded to non-invaded regions of the formation, and perhaps, to indicate those transitions via a display, alarm, etc. Thus, in some embodiments, the system 600 may comprise a monitor MONITOR to indicate transitions from invaded to non-invaded regions of the geological formation, based on values of the updated calibrated data, as determined by the processing unit 602.

In summary, using the apparatus, systems, and methods disclosed herein may provide an alternative to prior art workflows, where calibrating, processing, and inverting EM data are performed sequentially, with iterative processes appearing as errors in one procedure being propagated to subsequent procedures. That is, as described herein, various embodiments permit the simultaneous: (a) correction of EM data for imperfect calibration, (b) processing, and (c) inversion for calibration errors and earth model revision. This mechanism has the distinct advantage of reducing cycle time, improving the operation of the computer itself, as well as delivering EM data (e.g., resistivity data) with improved quality.

The advantages of inversion-based model updates, calibration, and processing can be applied in the same, simultaneous fashion to wireline, LWD, MWD, and permanent monitoring services, to rapidly reduce the effects of known systematic errors, and can be extended to include the joint inversion of EM data with other geophysical data (e.g., acoustic, nuclear, and NMR). These advantages can significantly enhance the value of the services provided by an operation/exploration company, helping to reduce time-related costs, and provide a greater return on investment.

Many other embodiments may be realized. Some of these will now be listed as non-limiting examples.

In some embodiments, a method comprises generating measured data associated with a geological formation by making measurements affected by tool response in a well bore; generating calibrated data by applying calibration parameters to the measured data; and parameterizing the geological formation in terms of initial earth model parameters, and generating predicted data by simulating the tool response using earth model parameters.

In some embodiments, the method comprises determining a difference between the calibrated data and the predicted data; simultaneously adjusting the calibration parameters and the earth model parameters such that the difference satisfies convergence criteria, to generate updated calibration parameters, updated calibrated data, and updated earth model parameters; and operating a controlled device in the well bore according to at least one of the updated calibration parameters, the updated calibrated data, or the updated earth model parameters.

In some embodiments, determining the difference further comprises determining the difference between the calibrated data and the predicted data is less than a selected threshold by evaluating convergence to a misfit.

In some embodiments, simultaneously adjusting comprises adjusting the calibration parameters and the earth model parameters to provide revised calibration parameters and revised earth model parameters when the difference between the calibrated data and the predicted data is greater than the selected threshold.

In some embodiments, operating the controlled device further comprises operating a geosteering device to select or modify a drilling direction in the geological formation, based on the updated earth model parameters.

In some embodiments, operating the controlled device comprises publishing at least some values of the at least one of the updated calibration parameters, the updated calibrated data, or the updated earth model parameters in a human-readable form. In some embodiments, the publishing comprises at least one of printing or displaying on a video display.

In some embodiments, operating the controlled device comprises recording at least some of the updated calibration parameters, the updated calibrated data, or the updated earth model parameters in a form that can be transported physically or electronically.

In some embodiments, operating the controlled device further comprises recalibrating a downhole tool using the updated calibration parameters.

In some embodiments, the method comprises obtaining the measured data from the geological formation during wireline, drilling, or permanently installed sensing operations.

In some embodiments, the method comprises generating revised calibrated data by applying the revised calibration parameters to the measured data; and simultaneously adjusting the revised calibration parameters and the revised earth model parameters such that the differences between the revised calibrated data and the predicted data satisfy the convergence criteria, to generate the updated calibration parameters, the updated calibrated data, and the updated earth model parameters In some embodiments, the method comprises calculating a misfit functional from a weighted residual error vector comprising weighted differences between the calibrated data and the predicted data.

In some embodiments, the method comprises calculating a stabilizing functional from the calibration parameters and the earth model parameters, and calculating a weighted sensitivity matrix of weighted sensitivities associated with the calibration parameters and the earth model parameters; solving an inverse problem by minimizing a parametric functional formed by a linear combination of the misfit functional and the stabilizing functional; and evaluating the convergence criteria of the inverse problem.

In some embodiments, the method comprises generating the weighted sensitivity matrix by applying data weights, model weights, or data and model weights to the sensitivity matrix.

In some embodiments, the method comprises generating a regularized pseudo-inverse of the sensitivity matrix or provide a regularized pseudo-inversion of the weighted sensitivity matrix.

In some embodiments, the method comprises determining a change in parameters associated with the earth model as the regularized pseudo-inversion of the sensitivity matrix multiplied by a regularized version of the residual error vector; and updating the earth model parameters to provide the updated earth model parameters using the change in parameters.

In some embodiments, a system comprises at least one tool to measure properties of a geological formation as measured data. The system may further comprise a processing unit coupled to the at least one tool to receive the measured data, the processing unit to generate calibrated data by applying calibration parameters to the measured data; to parameterize the geological formation in terms of initial earth model parameters, and generate predicted data by simulating the tool response using earth model parameters; to determine a difference between the calibrated data and the predicted data; to simultaneously adjust the calibration parameters and the earth model parameters such that the difference satisfies convergence criteria; to generate updated calibration parameters, updated calibrated data, and updated earth model parameters; and to operate a controlled device according to at least one of the updated calibration parameters, the updated calibrated data, or the updated earth model parameters.

In some embodiments, the controlled device comprises a bit steering mechanism that is operated to control drilling operations in the geological formation.

In some embodiments, the at least one tool comprises a multi-component induction tool.

In some embodiments, the system comprises a monitor to indicate transitions from invaded to non-invaded regions of the geological formation, based on values of the updated calibrated data, as determined by the processing unit. Many additional embodiments may be realized.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method, comprising:
    positioning a logging tool in a wellbore of a geologic formation, wherein the tool includes a sub-triaxial array;
    generating measured data associated with the geological formation by making measurements affected by a tool response of the tool in the well bore, wherein the measured data comprises a plurality of measurement components at different operating frequencies provided by the sub-triaxial array;
    generating calibrated data by applying calibration parameters to the measured data, wherein the calibration parameters include one or more of gain, phase, and bias;
    parameterizing the geological formation in terms of initial earth model parameters comprising one or more of resistivity, conductivity, density, permeability, chargeability, porosity, permittivity, and chargeability of an earth model, and generating predicted data by simulating the tool response using the initial earth model parameters;
    determining a difference between the calibrated data and the predicted data;
    simultaneously adjusting the calibration parameters and the initial earth model parameters during an inversion process to provide revised calibration parameters and revised earth model parameters data; determining a difference between revised calibrated data and revised predicted data, wherein the revised calibrated data is generated by applying the revised calibration parameters to the measured data and the revised predicted data is generated by simulating the tool response using the revised earth model parameters; and repeating the adjusting and determining until the difference satisfies convergence criteria, to generate updated calibration parameters, updated calibrated data, and updated earth model parameters corrected for systematic error in the measured data.

2. The method according to claim 1, further comprising:
    operating a geosteering device to select or modify a drilling direction in the geological formation, based on the updated earth model parameters.

3. The method according to claim 1, further comprising:
    publishing at least some values of the at least one of the updated calibration parameters, the updated calibrated data, or the updated earth model parameters in a human-readable form.

4. The method according to claim 3, wherein the publishing comprises at least one of printing or displaying on a video display.

5. The method according to claim 1, further comprising:
    recording at least some of the updated calibration parameters, the updated calibrated data, or the updated earth model parameters in a form that can be transported physically or electronically.

6. The method according to claim 1, further comprising:
    recalibrating a downhole tool using the updated calibration parameters.

7. The method according to claim 1, further comprising:
    obtaining the measured data from the geological formation during wireline, drilling, or permanently installed sensing operations.

8. The method according to claim 1, wherein determining the difference further comprises:
    determining the difference between the calibrated data and the predicted data is less than a selected threshold by evaluating convergence to a misfit.

9. The method according to claim 8, wherein simultaneously adjusting comprises:
    adjusting the calibration parameters and the initial earth model parameters to provide the revised calibration parameters and the revised earth model parameters when the difference between the calibrated data and the predicted data is greater than the selected threshold.

10. The method according to claim 1, further comprising:
    calculating a misfit functional from a weighted residual error vector comprising weighted differences between the calibrated data and the predicted data.

11. The method according to claim 10, further comprising:
    calculating a stabilizing functional from the calibration parameters and the initial earth model parameters, and calculating a weighted sensitivity matrix of weighted sensitivities associated with the calibration parameters and the initial earth model parameters;
    solving an inverse problem by minimizing a parametric functional formed by a linear combination of the misfit functional and the stabilizing functional; and
    evaluating the convergence criteria of the inverse problem.

12. The method according to claim 11, further comprising:
    generating the weighted sensitivity matrix by applying model weights to the sensitivity matrix.

13. The method according to claim 11, further comprising:
    generating the weighted sensitivity matrix by applying data and model weights to the sensitivity matrix.

14. The method according to 13, further comprising:
calculating a regularized pseudo-inverse of the weighted sensitivity matrix to provide a regularized pseudo-inversion of the weighted sensitivity matrix.

15. The method according to claim 14, further comprising:
determining a change in parameters associated with the earth model as the regularized pseudo-inversion of the weighted sensitivity matrix multiplied by a regularized version of the residual error vector; and
updating the initial earth model parameters to provide the updated earth model parameters using the change in parameters.

16. A system, comprising:
at least one logging tool to measure properties in a wellbore of a geological formation as measured data, wherein the tool includes a sub-triaxial array; and
a processing unit coupled to the at least one tool to receive the measured data, wherein the measured data comprises a plurality of measurement components at different operating frequencies provided by the sub-triaxial array; the processing unit to generate calibrated data by applying calibration parameters to the measured data, wherein the calibration parameters include one or more of gain, phase, and bias; to parameterize the geological formation in terms of initial earth model parameters comprising one or more of resistivity, conductivity, density, porosity, permeability, chargeability, permittivity, and chargeability, and generate predicted data by simulating a tool response using the initial earth model parameters; to determine a difference between the calibrated data and the predicted data; to simultaneously adjust the calibration parameters and the initial earth model parameters during an inversion to provide revised calibration parameters and revised earth model parameters data, determining a difference between revised calibrated data and revised predicted data, wherein the revised calibrated data is generated by applying the revised calibration parameters to the measured data and the revised predicted data is generated by simulating the tool response using the revised earth model parameters; and repeating the adjusting and determining until the difference satisfies convergence criteria to generate updated calibration parameters, updated calibrated data, and updated earth model parameters corrected for systematic error in the measured data.

17. The system according to claim 16, further comprising operating a bit steering mechanism to control drilling operations in the geological formation according to at least one of the updated calibration parameters, the updated calibrated data, or the updated earth model parameters.

18. The system according to claim 16, further comprising:
a monitor to indicate transitions from invaded to non-invaded regions of the geological formation, based on values of the updated calibrated data, as determined by the processing unit.

19. The method according to claim 1, further comprising operating a controlled device to control drilling in the well bore according to at least one of the updated calibration parameters, the updated calibrated data, or the updated earth model parameters.

20. The system according to claim 16, wherein the processing unit is to further operate a controlled device to control drilling of the wellbore according to at least one of the updated calibration parameters, the updated calibrated data, or the updated earth model parameters.

21. The system according to claim 16, wherein the logging tool is one or more of a multi-component induction tool, measurement while drilling tool, or logging while drilling tool.

* * * * *